United States Patent [19]
Delafosse

[11] 4,119,490
[45] Oct. 10, 1978

[54] NUCLEAR FUEL ASSEMBLY
[75] Inventor: Jacques Delafosse, Gif-sur-Yvette, France
[73] Assignee: Commissariat a l'Energie Atomique, Paris, France
[21] Appl. No.: 753,451
[22] Filed: Dec. 22, 1976
[30] Foreign Application Priority Data
Jan. 12, 1976 [FR] France .............................. 76 00606
[51] Int. Cl.² ............................................. G21C 3/30
[52] U.S. Cl. ...................................... 176/78; 176/76
[58] Field of Search .................................... 176/78, 76
[56] References Cited
U.S. PATENT DOCUMENTS

| | | | |
|---|---|---|---|
| 3,791,466 | 2/1974 | Patterson | 176/78 |
| 3,920,516 | 11/1975 | Kmonk | 176/78 |
| 3,954,560 | 5/1976 | Delafosse | 176/78 |
| 3,997,394 | 12/1976 | Aisch | 176/78 |

Primary Examiner—Samuel W. Engle
Assistant Examiner—Donald P. Walsh
Attorney, Agent, or Firm—Thomas R. Boland

[57] ABSTRACT

A fuel assembly for a light-water or heavy-water reactor or for a fast reactor comprises a bundle of clad fuel pins disposed on a uniform lattice and maintained in parallel relation by means of separate spacer grids fitted with resilient members for applying the grids against the fuel pins. A rigid support structure is formed by two parallel end-plates braced by tie-rods having the same diameter as the fuel pins and disposed at uniform intervals at the lattice nodes. The fuel-pin bundle is associated with a single support grid rigidly fixed at the midpoint of the tie-rods, the other grids being uniformly spaced in the vertical direction on each side so that elongation of the fuel pins takes place upwards and downwards from the support grid.

3 Claims, 1 Drawing Figure

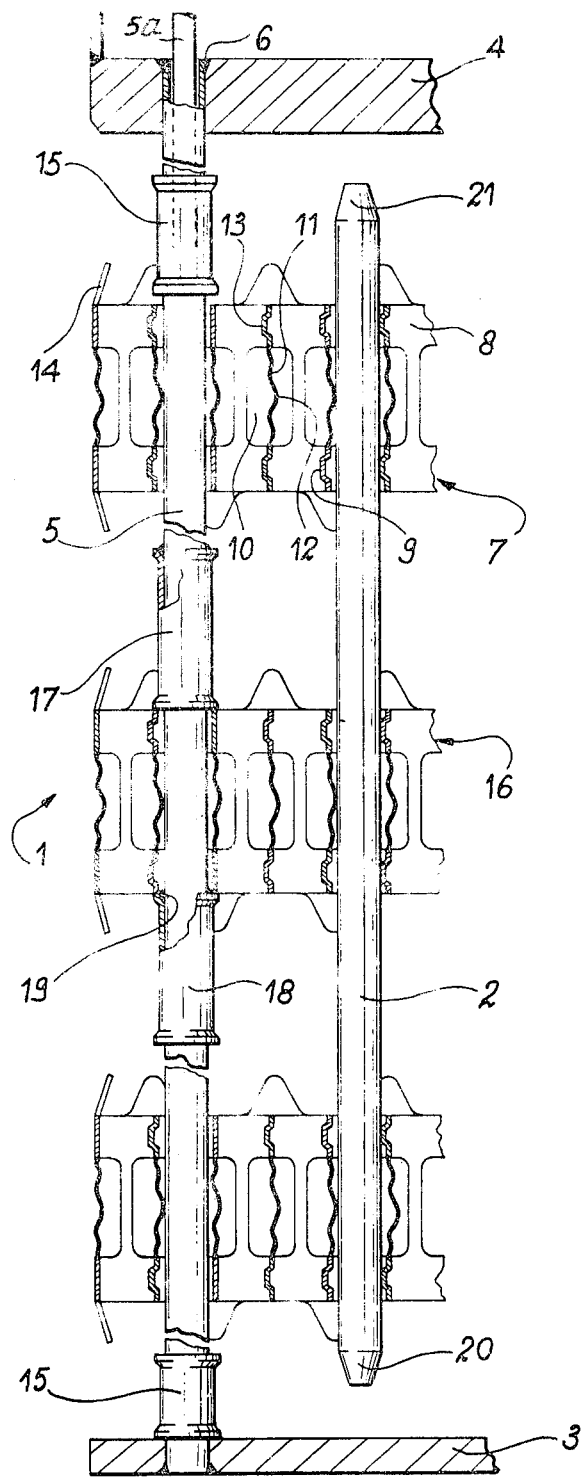

NUCLEAR FUEL ASSEMBLY

This invention relates to a nuclear fuel assembly for a light-water or heavy-water reactor or for a fast reactor, of the type comprising a bundle of clad fuel pins maintained in parallel relation at the nodes of a uniform lattice by means of a series of separate grids fitted with members which serve to apply said grids against said fuel pins.

The invention is primarily applicable when the fuel assembly and especially the assembly as herein described and claimed in U.S. Pat. No. 3,954,560 comprises a rigid support structure formed by two parallel end plates braced by tie-rods located at uniform intervals in the lattice of fuel pins at the nodes of said lattice, the diameter of said tie-rods being substantially the same as that of the fuel pins. In this case the spacer grids are not rigidly connected to said tie-rods but so arranged as to be capable of sliding on these latter either by means of springs which bear on the tie-rods or even by means of sleeves which are carried by the grids and in which said tie-rods slide freely. In the case of springs and by reason of the greater number of fuel pins than that of the tie-rods, the grids are caused to follow said fuel pins in those movements which result from differential expansions during operation and slide along said tie-rods. As an advantageous feature, abutment members in the form of sleeves or the like are provided on the tie-rods between the different grids in order to limit the displacements of these latter beyond certain predetermined limits.

In point of fact, in a design solution of this type, the fuel pins of the bundle which usually extend in the vertical direction rest on the bottom plate of each fuel assembly whilst the grids slide along the tie-rods together with the fuel pins towards the top plate. Under these conditions, the elongations of said fuel pins are liable to attain not-negligible values, especially in the case of fuel assemblies having longitudinal dimensions of the order of 4 m as in the design solutions at present in existence. Sliding of the upper grids accordingly becomes excessive and is liable to give rise to problems of guiding and supporting of the fuel-pin bundle.

The present invention relates to a nuclear fuel assembly which overcomes these disadvantages. To this end, the assembly under consideration is distinguished by the fact that the bundle of fuel pins is associated with a single support grid rigidly fixed to tie-rods, the other grids being placed in uniformly spaced relation along the fuel assembly on each side of the support grid in the vertical direction so as to ensure that the elongations of the fuel pins take place from said support grid respectively towards the bottom and top plates.

Further distinctive features of a fuel assembly as constructed in accordance with the invention will also become apparent from the following description of one exemplified embodiment which is given by way of indication and not in any limiting sense, reference being made to the single figure of the accompanying drawing which shows a diagrammatic axial part-sectional view of the fuel assembly under consideration.

It will first be recalled that, in some conventional designs of fuel assemblies comprising a top plate and a bottom plate connected by means of vertical tie-rods and provided with intermediate spacer grids for the bundle of fuel pins, consideration has already been given to the possibility of securing all these grids with respect to the tie-rods, this being achieved especially by making use of sleeves placed within different cavities of said grids and of insetting rings or by making use of any other equivalent means. In a solution of this type, the expansion of the fuel pins as a result of temperature and irradiation effects causes relative sliding motion of said pins in the grids with attendant dangers of jamming, deformation and especially of wear of the fuel-pin cladding.

It is also recalled that, in U.S. Pat. No. 3,954,560 cited earlier, a solution of entirely different conception has already been proposed in which the complete assembly of fuel pins slides freely with the grids along the tie-rods of the fuel assembly, stops or abutment members placed on each side of said grids being so arranged as to limit abnormal displacements in the event of abnormal expansion. In this mode of assembly, the fuel pins rest on the bottom plate and all elongations take place in the upward direction.

The single FIGURE of the accompanying drawing illustrates another alternative form of construction with which the present invention is more especially concerned.

As shown in this FIGURE, the fuel assembly which is illustrated diagrammatically and generally designated by the reference numeral 1 is composed of a bundle of clad fuel pins 2 having a vertical axis and located in parallel relation. In the example chosen, the fuel bundle consists of 264 pins of uranium oxide $UO_2$ clad with a zirconium alloy. The bundle is placed between two horizontal plates consisting respectively of a bottom plate 3 and a top plate 4. These two plates are braced by means of hollow tie-rods 5 which are located in suitably spaced relation within the bundle of fuel pins 2, especially at predetermined nodes of this lattice. As an advantageous feature, the tie-rods 5 which are 24 in number have a diametrical dimension which is substantially identical with that of the fuel pins and are rigidly fixed to the end plates by means of weld fillets 6 so as to constitute a rigid support structure. Furthermore, these tie-rods can also serve as guides for control elements such as 5a which are slidably mounted within said tie-rods in order to modify the reactivity within the reactor core.

Bracing of the fuel pins 2 of the bundle with respect to the tie-rods 5, especially between the end plates 3 and 4, is carried out by means of parallel grids 7 which are eight in number and located at suitable intervals along said fuel pins in the vertical direction. Each grid 7 aforesaid is constituted in a manner known per se by two sets of sheet-metal members 8 and 9 respectively which extend in two perpendicular directions so as to define between them a series of cavities having a square cross-section and each traversed by one of the pins of the bundle. The grids 7 are rigidly fixed to said fuel pins by means of a resilient bearing connection. To this end, said grids are provided in their plates 8 and 9 with central cavities 10 of substantial width. The top and bottom edges of said cavities are connected by means of corrugated strips 11 which form springs and are provided with a projecting rib 12 in the central portion thereof. Said rib is capable of coming into contact with the fuel pin or with the tie-rod which extends through the corresponding cavity. The top and bottom portions of the plates 8 and 9 are further provided with bosses 13 and the fuel pins 2 are applied against said bosses by the strips 11. These arrangements which have already been described in U.S. Pat. No. 3,954,560 filed Dec. 11, 1972 serve to ensure suitable position-maintenance of the grids 7 with respect to the bundle of fuel pins while ensuring the possibility of a sliding connection between the components. In fact, by virtue of these connections, the grids 7 which are thus secured to the bundle of fuel pins 2 follow said pins as these latter undergo displacements under the action of differential expansions and accordingly slide with respect to the tie-rods 5. However, the relative movements of said grids are usually limited by abutment sleeves 15 fitted over the tie-rods 5 and having longitudinal dimensions so determined as to define with the grids and the end plates free spaces which are sufficient but nevertheless such that the displacements of the grids do not exceed a predetermined value.

In accordance with the invention, the fuel assembly as thus constituted comprises a central grid 16 which, in contrast to the other spacer grids 7 of the bundle of fuel pins 2, is rigidly fixed to the tie-rods 5 by means of two sleeves 17 and 18 respectively, said sleeves being permanently secured to the plates 8 and 9 which form said grid 16 by means of spot welds 19. Said central grid 16 thus has the effect of supporting all the fuel pins 2 of the bundle by means of its resilient connections 11, 13. Said fuel pins are thus suspended from the central portion of the assembly and intended to leave between their end-caps 20 and 21 and the plates 3 and 4 a free space which is sufficient to ensure that elongation of said fuel pins can be distributed in a substantially equivalent manner both upwards and downwards in the direction of said two plates.

In accordance with the invention, the fuel assembly therefore behaves in a manner similar to two superposed assemblies of the type described in the U.S. Patent cited earlier. As can readily be understood, this results in an appreciable reduction of problems connected with deformation, jamming or wear as a result of sliding motion and resulting from expansion of the fuel pins. Expansion of the pins is distributed to a substantially equal extent on each side of the central grid, said grid being in turn secured with respect to the rigid frame formed by tie-rods and end plates. On the other hand, the other grids which are placed on each side of the central grid along the fuel pins in the vertical direction are rigidly fixed to the tie-rods and the fuel pins by means of simple resilient contacts. Since the number of fuel pins is appreciably greater than the number of tie-rods within the fuel assembly, said grids thus follow preferantially the movement of expansion of the fuel pins while sliding along the tie-rods. Friction on said tie-rods accordingly has the effect of preventing any wear of the fuel-pin cladding.

It is readily apparent that the invention is not limited in any sense to the example of construction described in the foregoing and illustrated in the drawing but extends on the contrary to all alternative forms.

What we claim is:

1. A nuclear fuel assembly comprising a bundle of clad fuel pins maintained in parallel relation at the nodes of a uniform lattice by means of a series of separate grids fitted with members which apply said grids against said fuel pins, and a rigid structure formed by two parallel end plates braced by tie-rods located at uniform intervals in the lattice of fuel pins at the nodes of said lattice, the diameter of said tie-rods being substantially the same as the diameter of said fuel pins, wherein the bundle of pins is associated with a single support grid rigidly fixed to the tie-rods, the other grids being adapted for sliding movement on said tie-rods and placed in uniformly spaced relation along the fuel assembly on each side of the support grid in the vertical direction so as to ensure that the elongations of the fuel pins take place from said support grid respectively towards the bottom and top plates.

2. A fuel assembly according to claim 1, wherein the support grid is placed substantially at the mid-height of said assembly.

3. A fuel assembly according to claim 1, wherein the support grid is rigidly fixed to the tie-rods by means of sleeves which surround said tie-rods and are placed on each side of said grid, said sleeves being welded respectively to said grid and to said tie-rods.

* * * * *